United States Patent
Le Callonnec et al.

(10) Patent No.: US 12,028,440 B2
(45) Date of Patent: *Jul. 2, 2024

(54) METHOD AND SYSTEM FOR AUDITING SMART CONTRACTS

(71) Applicant: Mastercard International Incorporated, Purchase, NY (US)

(72) Inventors: Sébastien Le Callonnec, Greystones (IE); Eduardo Andrade, Dublin (IE); Rakesh Yadav, Cape Elizabeth, ME (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/095,283

(22) Filed: Jan. 10, 2023

(65) Prior Publication Data
US 2023/0163947 A1    May 25, 2023

Related U.S. Application Data

(63) Continuation of application No. 17/205,386, filed on Mar. 18, 2021, now Pat. No. 11,558,173.
(Continued)

(51) Int. Cl.
*H04L 9/06*   (2006.01)
*G06F 8/41*   (2018.01)

(52) U.S. Cl.
CPC . *H04L 9/06* (2013.01); *G06F 8/41* (2013.01)

(58) Field of Classification Search
CPC . H04L 9/06; H04L 9/3247; H04L 9/50; H04L 2209/56; H04L 9/3239; G06F 8/41
See application file for complete search history.

(56) References Cited

U.S. PATENT DOCUMENTS

| | | |
|---|---|---|
| 9,849,364 B2 | 12/2017 | Tran et al. |
| 11,366,882 B2 | 6/2022 | Wright et al. |

(Continued)

FOREIGN PATENT DOCUMENTS

| | | |
|---|---|---|
| CN | 108229170 A | 6/2018 |
| CN | 109040133 A | 12/2018 |
| WO | 2018/111295 A1 | 6/2018 |

OTHER PUBLICATIONS

L'Hutereau et al.; "Blockchain-based Metadata Protection for Archival Systems", 2019 38th Symposium on Reliable Distributed Systems (SRDS), IEEE, pp. 315-323. (Year: 2019).*

(Continued)

*Primary Examiner* — Matthew Smithers
(74) *Attorney, Agent, or Firm* — Panitch Schwarze Belisario & Nadel LLP (57) ABSTRACT

A method and system are disclosed to audit smart contracts. The method includes: publishing, with a processing server, a smart contract bytecode with metadata on a blockchain; retrieving, with the processing server, the published smart contract bytecode with metadata from the blockchain; extracting, with the processing server, the smart contract bytecode from the published smart contract bytecode; and verifying the smart contract bytecode by comparing a computed hash of a high-level source code of the published smart contract bytecode with the metadata retrieved from the blockchain.

13 Claims, 10 Drawing Sheets

Related U.S. Application Data (60) Provisional application No. 62/992,240, filed on Mar. 20, 2020.

(56) References Cited

U.S. PATENT DOCUMENTS

| | | | |
|---|---|---|---|
| 11,416,474 B2* | 8/2022 | Ponceleon | G06F 16/2379 |
| 11,558,173 B2* | 1/2023 | Le Callonnec | H04L 9/3239 |
| 2016/0380771 A1 | 12/2016 | Pepin et al. | |
| 2018/0109516 A1 | 4/2018 | Song et al. | |
| 2019/0065709 A1 | 2/2019 | Salomon | |
| 2019/0130368 A1 | 5/2019 | Li et al. | |
| 2019/0279160 A1 | 9/2019 | Whitney et al. | |
| 2019/0303541 A1* | 10/2019 | Reddy | G06F 21/64 |
| 2019/0319798 A1 | 10/2019 | Chalkias | |
| 2020/0026510 A1 | 1/2020 | Adams et al. | |
| 2020/0028691 A1 | 1/2020 | Rao et al. | |
| 2020/0104296 A1 | 4/2020 | Hunn et al. | |
| 2020/0118068 A1 | 4/2020 | Turetsky et al. | |
| 2020/0204345 A1 | 6/2020 | Chee et al. | |
| 2020/0357084 A1 | 11/2020 | Lerato Hunn et al. | |
| 2020/0389311 A1 | 12/2020 | Tang et al. | |
| 2020/0389318 A1* | 12/2020 | Irazabal | H04L 63/126 |
| 2021/0067536 A1 | 3/2021 | Mylrea et al. | |
| 2021/0110047 A1 | 4/2021 | Fang | |
| 2021/0160069 A1 | 5/2021 | Watanabe et al. | |
| 2021/0182848 A1 | 6/2021 | Benko | |

OTHER PUBLICATIONS

Notification of Transmittal of the International Search Report and the Written Opinion of the International Searching Authority, dated Jul. 12, 2021, bythe International Application Division Korean Intellectual Property Office in corresponding International Application No. PCT/US2021/022904, 8 pps.

Liu, et al.; "Enabling Clone detection for Ethereum via115 Smart Contract Birthmarks", 2019 IEEE/ACM 27th International Conference on Program Comprehension (ICPC), pp. 105—(Year: 2019).

Rouhani et al.; "Security, Performance, and Application of Smart Contracts: A Systematic Survey", 2019, IEEE Access, pp. 50759-50779. (Year: 2019).

Amani et al.: "Towards Verifying Ethereum Smart Contract Bytecode in Isabelle/HOL", 2018, ACM pp. 66-77. (Year: 2018).

28.Brent et al.; "Vandal: A Scalable Security Analysis Framework for Smart Contracts", 2018, arXiv, pp. 1—(Year: 2018).

Zhang et al., "Genie: A Secure, Transparent Sharing and Services Platform for Genetic and Health Data", arxiv.org, Cornell University Library, 201 Olin Library Cornell University Ithaca, NY 14853, Nov. 4, 2018, XP080942047, 10 pages.

Extended European Search Report, dated Mar. 1, 2024, issued in corresponding European Application No. 21771691.9-1218, 39 pages.

* cited by examiner

METHOD AND SYSTEM FOR AUDITING SMART CONTRACTS

FIELD

The present disclosure relates to a method and system for auditing smart contracts, and more particularly a method and system for auditing smart contracts on a blockchain through the use of hashing functions.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also provides anonymity as to the individuals or entities involved in a transaction. New blocks are added to the blockchain through a process known as "consensus." In a traditional consensus process, blockchain nodes work to generate a new block that satisfies all requirements, a process known as "mining," and then will share the new block with other nodes. The other nodes will confirm that the block is suitable and then distribute the block throughout the blockchain, which effectively adds that block into the blockchain and moves the nodes on to working on consensus on the next block.

Smart contracts are written using a high-level language which makes it easier for developers to create them. For example, a high-level language (HLL) can include programming languages such as C, FORTRAN, or Pascal that enables a programmer to write programs that are more or less independent for a particular type of computer. Such languages can be considered high-level because they are closer, for example, to human languages and further from machine languages. When smart contracts are deployed to a blockchain, the smart contracts are compiled into a compact bytecode format, which can be executed by a virtual machine when invoking one of its clauses.

Despite the smart contract bytecode being public, auditing the smart contract requires either analyzing the bytecode itself, which can be difficult, or to transform the bytecode back into a high-level language ("decompilation") for analysis, may require additional tools.

SUMMARY

In accordance with an embodiment, it would be desirable to have a method and system for auditing smart contracts on a blockchain, for example, for security flaws and vulnerabilities, through the use of hashing. In accordance with an embodiment, the bytecode of the smart contract is published with metadata, including the hash of the original high-level source code compiled to generate the smart contract, and the version of the compiler used.

In accordance with another embodiment, the original high-level code is published with metadata, which can be used to compute the hash of the compiled bytecode. The resulting hash can then be compared with the actual hash value of the published smart contract as proof that the published high-level code is the one that produced the smart contract bytecode. The published high-level code is then used for analysis. In accordance with an embodiment, the above-mentioned approaches may be combined to give either option to a person auditing the smart contract.

In accordance with an aspect, a method is disclosed to audit smart contracts, the method comprising: publishing, with a processing server, a smart contract bytecode with metadata on a blockchain; retrieving, with the processing server, the published smart contract bytecode with metadata from the blockchain; extracting, with the processing server, the smart contract bytecode from the published smart contract bytecode; and verifying the smart contract bytecode by comparing a computed hash of a high-level source code of the published smart contract bytecode with the metadata retrieved from the blockchain.

In accordance with an aspect, a system is disclosed for auditing smart contracts, the system comprising: a processing server configured to: publish a smart contract bytecode with metadata on a blockchain; retrieve the published smart contract bytecode with metadata from the blockchain; extract the smart contract bytecode from the published smart contract bytecode; and verify the smart contract bytecode by comparing a computed hash of a high-level source code of the published smart contract bytecode with the metadata retrieved from the blockchain.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by Mastercard®, VISA®, Discover®, American Express®, PayPal®, etc. Use of the term "payment network" herein may refer to both the payment network as an entity, and the physical payment network, such as the equipment, hardware, and software executed on hardware comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, etc.) in a physical location that a customer visits as part of the transaction, such as in a "brick and mortar" store, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

System for Auditing Smart Contracts on a Blockchain Network

Figure 1:
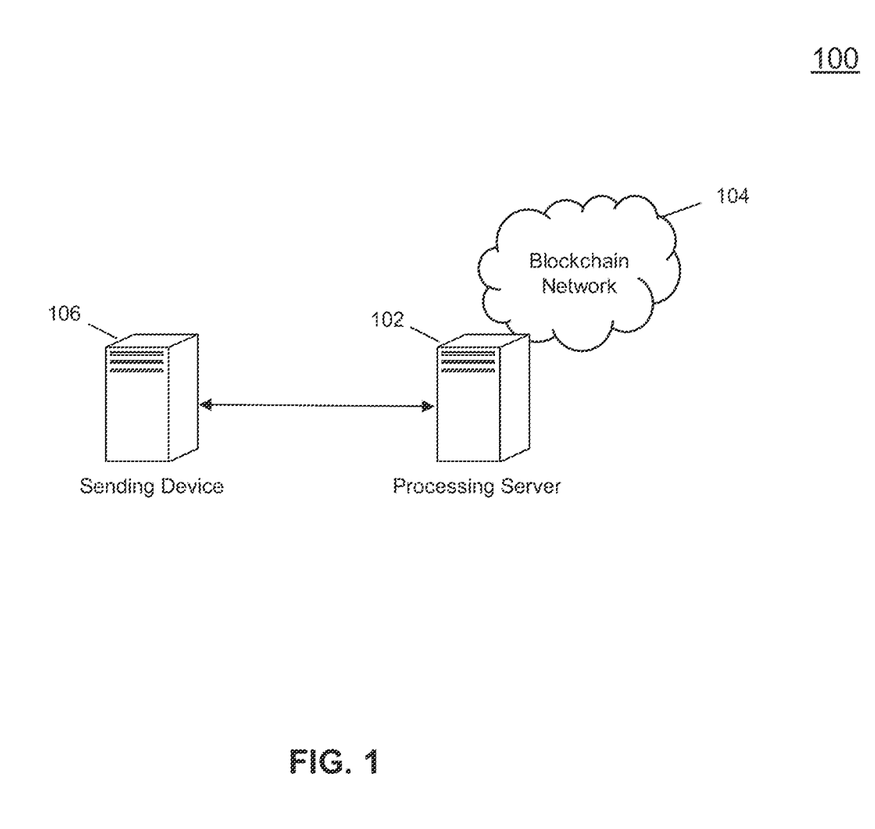
FIG. 1 is a block diagram illustrating a high level system architecture for auditing a smart contract in accordance with exemplary embodiments.

FIG. 1 illustrates a system 100 for auditing smart contracts on a blockchain through the use of hashing.

The system 100 may include a processing server 102. The processing server 102 may be one of a plurality of nodes comprising a blockchain network 104. The blockchain network 104 may be associated with one or more blockchains, which may be used to store data associated with a sending device 106 (for example, a merchant, an acquirer and/or issuer via a payment network). The processing server 102 may be configured to generate and validate new blocks that are added to the blockchain, where the validation process for a new block may involve mathematical verification of data stored therein across a plurality of the nodes comprising the blockchain network 104. The processing server 102, discussed in more detail below with respect to FIG. 10, may be configured to obtain services provided by the sending device 106, store such data in a new block that is generated and added to the blockchain, and, in some cases, may provide services to others.

In accordance with an embodiment, the blockchain network 104 may be comprised of a plurality of blocks, where each block is comprised of a block header and one or more data values. The data values may each be associated with services provided by the sending device 106 (i.e., issuers or issuing institutions), and may include, for example, services directed to smart contacts as disclosed herein. Each block header may include at least a timestamp, a block reference value, and a data reference value. The timestamp may be a stamp of a time when the block header is generated. The block reference value may be a reference to the previous block (e.g., determined via timestamp) in the blockchain. In some cases, the block reference value may be a hash value generated via the application of one or more hashing algorithms to the block header of the previous block. The data reference value may be a reference to the one or more data values included in the respective block. In some cases, the data reference value may be a hash value generated via the application of one or more hashing algorithms, which may be the same or different than those used in generation of the block reference value, to the one or more data values included in the block. The use of the reference values may ensure that the data stored in the blockchain is immutable, as a modification to any data value can be detected via generation of the data reference value, as it would thus differ from the value stored in the block header, which would, in turn result in a different block reference value for the subsequent block, which would carry on through every subsequent block. As a result, no block header or data value may be modified without requiring modification to every single subsequent block in the blockchain. As each node in the blockchain network 104 may store the blockchain, no modification to the blockchain may be performed without compromise of every single node.

In accordance with an embodiment, the processing server 102 of the blockchain network 104 may receive the data value corresponding to the services offered by the sending device 106, which may be included in a newly generated block (e.g., and incorporated into the data reference value in the respective block header). The generated block may be validated by other nodes in the blockchain network 104 using traditional methods, which may include independent generation of the reference values and validation thereof. Once validation is completed, the newly generated block may be added to the blockchain and provisioned to all of the nodes in the blockchain network 104. In some embodiments, validation of the data prior to addition of the new block may include authentication of the sending device 106. In some instances, authentication may be performed via a password or other unique value(s) provided by the sending device 106 for authentication thereof. In other instances, the blockchain network 104 may provision a private key to the sending device 106 of a cryptographic key pair. In such an instance, the sending device 106 may generate a digital signature using their private key, which may be submitted to the processing server 102 with their services provided. In these instances, the processing server 102 may validate the digital signature using the corresponding public key and associated signature validation algorithms to authenticate the sending device 106. In some cases, the other nodes comprising the blockchain network 104 may also validate the digital signature as part of the validation process before confirming a new block for addition to the blockchain.

In accordance with an embodiment, the blockchain network 104 can alternatively be a private or permissioned blockchain. In such embodiments, only authorized entities (e.g., sending device 106) may have access to the data stored in the blockchain network 104. In these embodiments, access may be limited to the sending device 106 using any suitable method, such as being stored in a private network or location, being encrypted, etc.

Publishing the Smart Contract Bytecode

Figure 2:
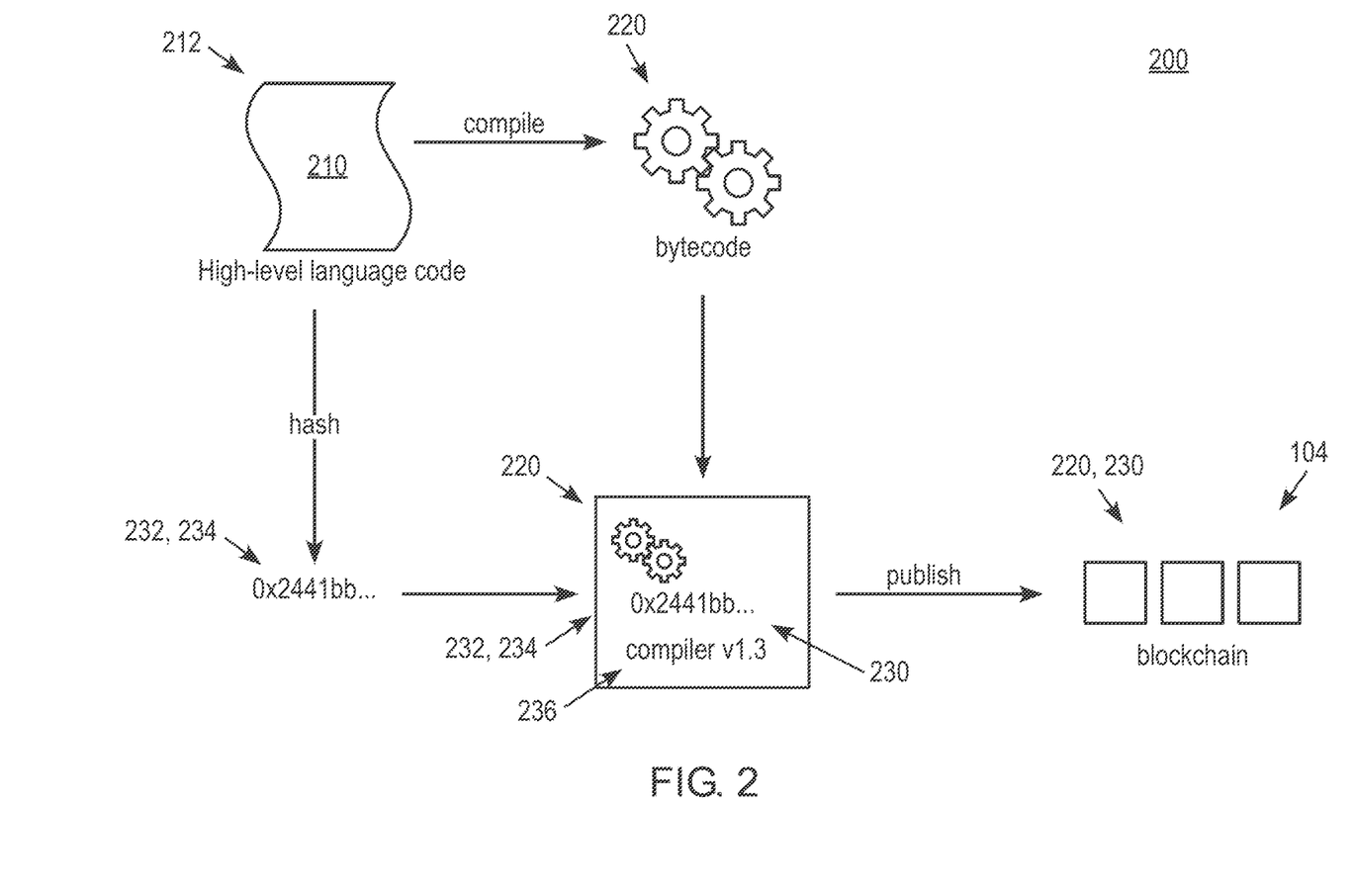
FIG. 2 is a diagram illustrating a method for publishing a smart contract in accordance with an exemplary embodiment.

FIG. 2 is a diagram 200 illustrating a method for publishing a smart contract 210 in accordance with an exemplary embodiment. As shown in FIG. 2, the smart contract 210 is written in a high-level language into a high-level source code 212, and the high-level source code 212 is compiled into a bytecode 220. In accordance with an embodiment, the smart contract 210 in the form of the bytecode 220 is published on the blockchain network 104 with metadata 230. The metadata 230 can include a hash function used to produce the hash of the high-level source code $H_f$ 232, a hash of a high-level source code $h_c$ 234, and a Version V of the compiler 236 used to compile the bytecode 220. As a separate step, the original high-level source code 212 can be published on-chain (i.e., on the blockchain network 104) for easier retrieval, or by a different channel, for example, an online source code repository, for later verification.

Figure 3:
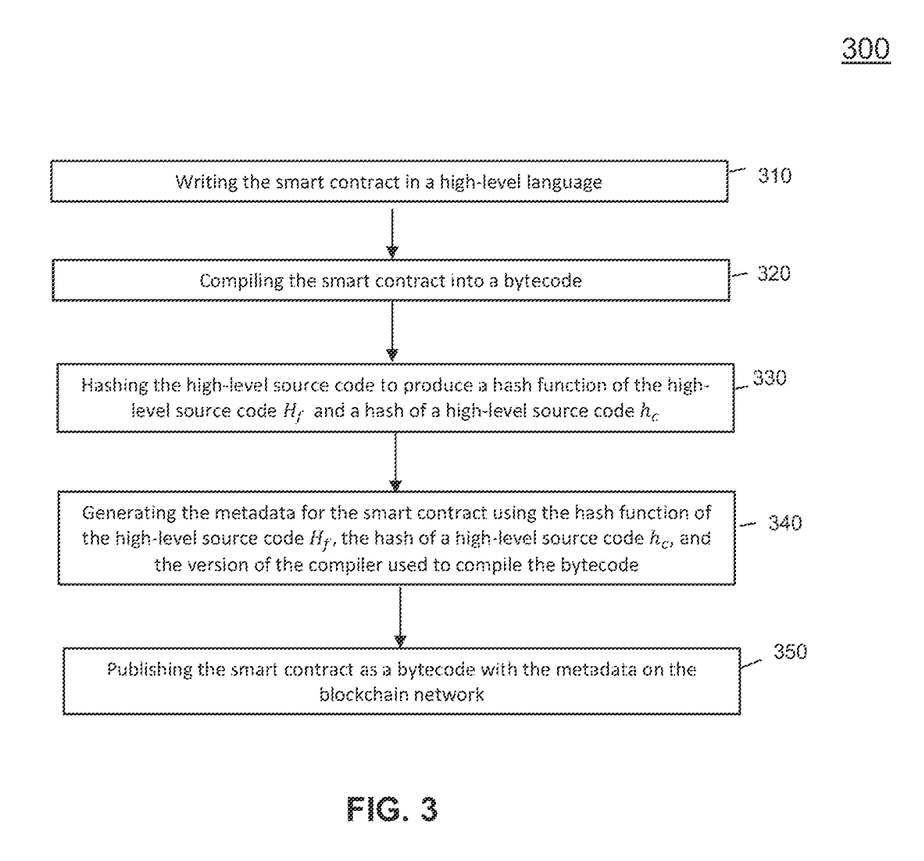
FIG. 3 is a flowchart illustrating a method for publishing a smart contract in accordance with the embodiment as shown in FIG. 2 in accordance with an exemplary embodiment.

FIG. 3 is a flowchart illustrating a method 300 for publishing a smart contract 210 in accordance with the embodiment as shown in FIG. 2. As shown in FIG. 3, in step 310, the smart contract 210 is written in a high-level language into a high-level source code 212. In step 320, the smart contract 210 in the high-level source code 212 is compiled into a bytecode 220. In step 330, the high-level source code 212 is hashed to produce a hash function of the high-level source code $H_f$ 232 and a hash of a high-level source code $h_c$ 234. In step 340, the metadata 230 of the smart contract 210 is generated using the hash function used to produce the hash of the high-level source code $H_f$ 232, the hash of a high-level source code $h_c$ 234, and the version of the compiler 236 used to compile the bytecode 220. In step 350, the smart contract 210 is published as a bytecode 220 with the metadata 230 on the blockchain network 104.

Publishing the Smart Contract High-Level Code

Figure 4:
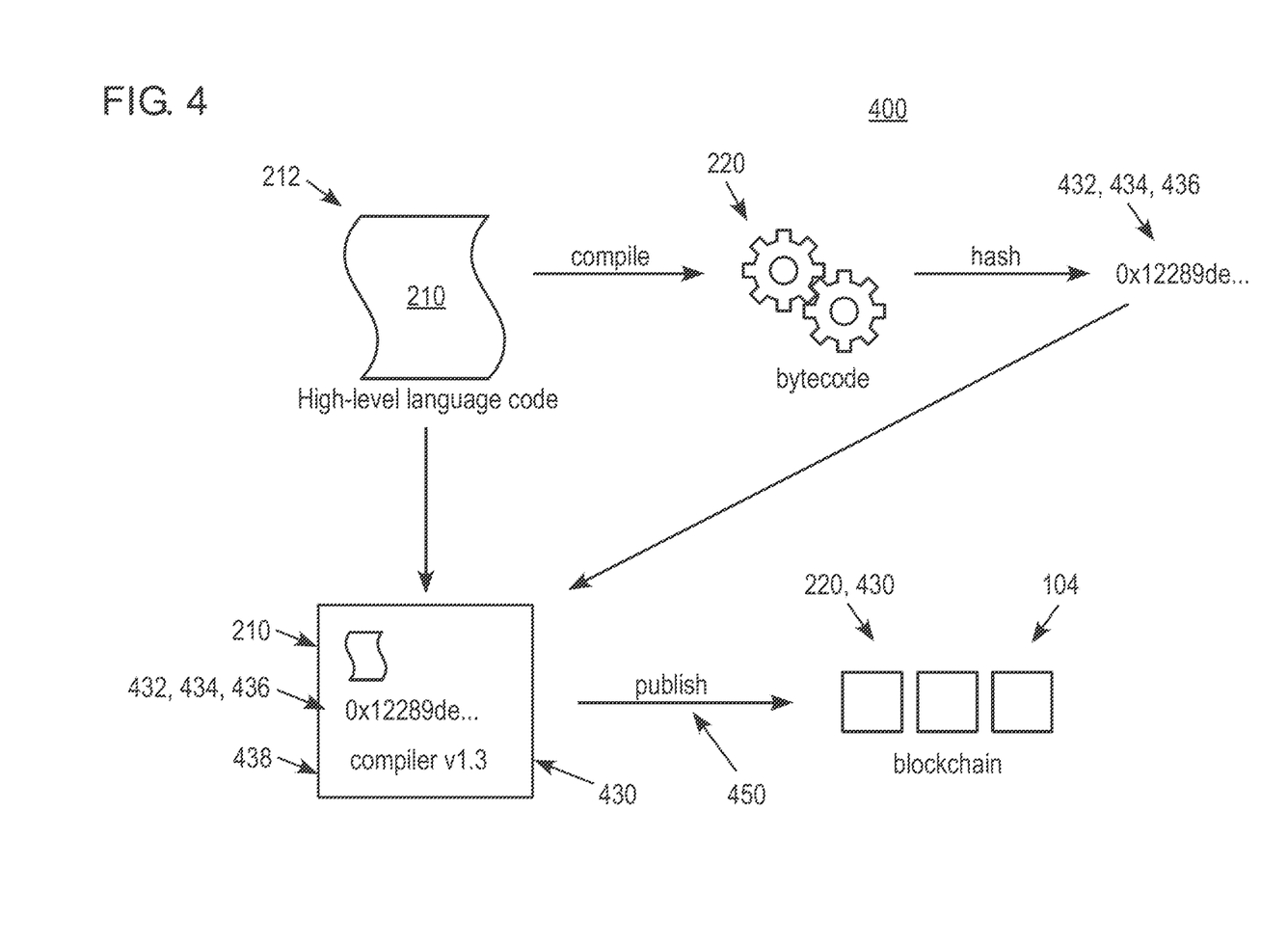
FIG. 4 is a diagram illustrating a method for publishing a smart contract in accordance with another exemplary embodiment.

FIG. 4 is a diagram 400 illustrating a method for publishing a smart contract 210 in accordance with another exemplary embodiment. As shown in FIG. 4, the high-level source code 212 of the smart contract 210 can be published 450 on the blockchain 104 with the following metadata 430: a hash function used to produce the hash of the bytecode $H_f$ 432, a hash of the generated bytecode $h_g$ 434, a version of the compiler 438 used to compile the published bytecode V, a hash of the transaction publishing the smart contract bytecode $h_t$ 436, and optionally the bytecode 220 of the smart contract 210 itself. In accordance with an embodiment, the transaction may or may not be signed with the same private key used to sign the transaction publishing the original bytecode 220, which means that someone can publish the high-level source code 212 of a smart contract 210 on behalf of its author.

Figure 5:
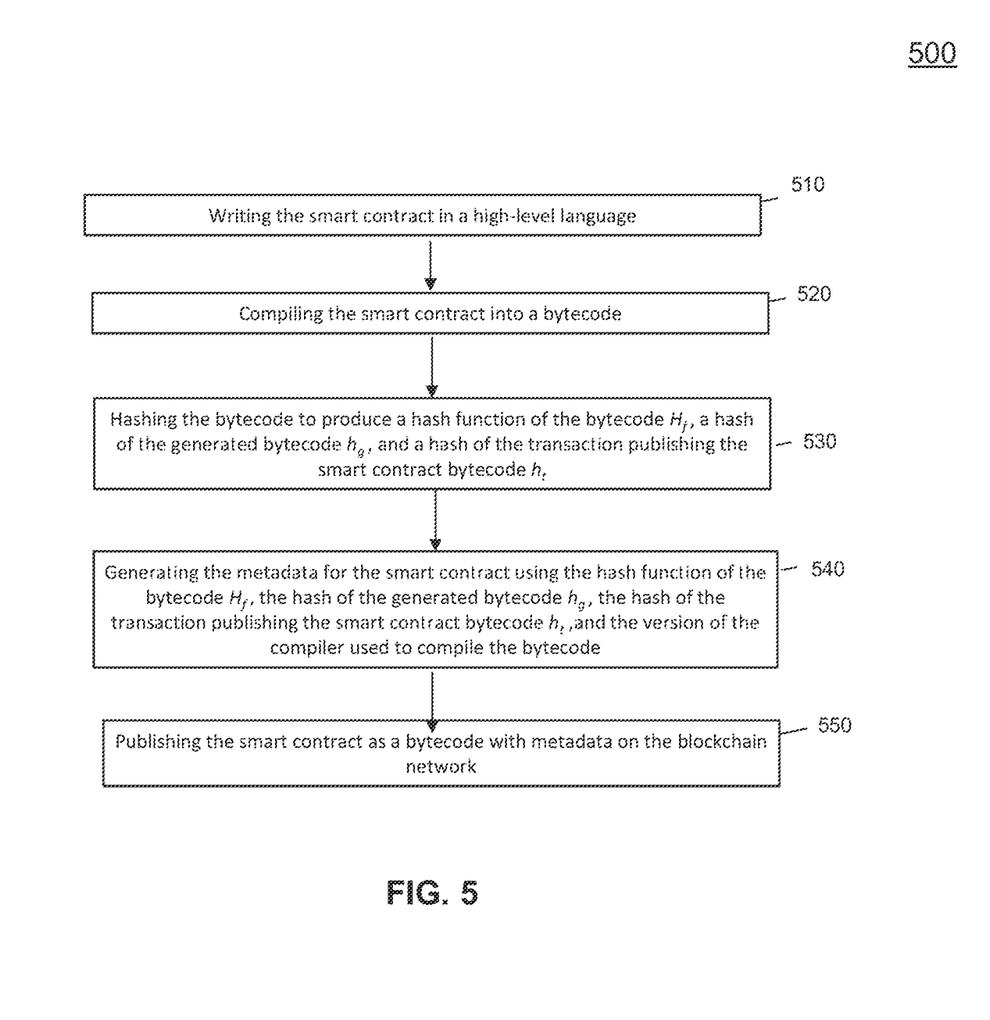
FIG. 5 is a flowchart illustrating the method for publishing a smart contract in accordance with the embodiment as shown in FIG. 4 in accordance with an exemplary embodiment.

FIG. 5 is a flowchart 500 illustrating the method for publishing a smart contract in accordance with the embodiment as shown in FIG. 4. As shown in FIG. 5, in step 510, the high-level source code 212 of the smart contract 210 is written in a high-level language. In step 520, the high-level source code 212 of the smart contract 210 is compiled into a bytecode 220. In step 530, the bytecode 220 is hashed to produce a hash function of the bytecode $H_f$ 432, a hash of the generated bytecode $h_g$ 434, and a hash of the transaction publishing the smart contract bytecode $h_t$ 436. In step 540, the metadata 430 for the smart contract 210 is generated using the hash function of the bytecode $H_f$ 432, the hash of the generated bytecode $h_g$ 434, the hash of the transaction publishing the smart contract bytecode $h_t$ 436, and the version of the compiler 438 used to compile the bytecode 220. In step 550, the bytecode 220 and the metadata 430 of the smart contract 210 is published on the blockchain network 104

Verifying the Bytecode without a Compiler

Figure 6:
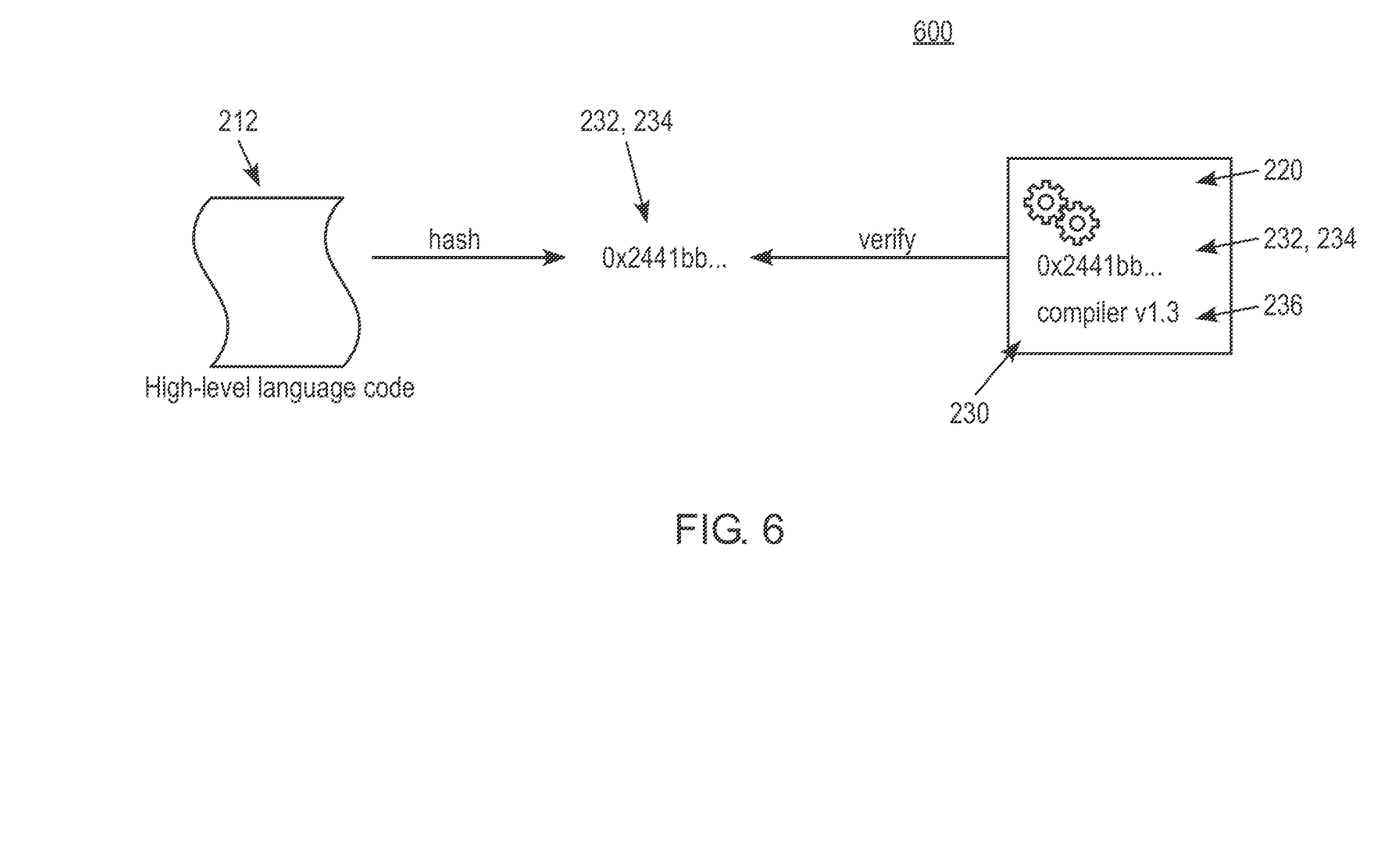
FIG. 6 is a diagram illustrating a method for verifying the bytecode without a compiler in accordance with an exemplary embodiment.

FIG. 6 is a diagram 600 illustrating a method for verifying the bytecode 220 without a compiler in accordance with an exemplary embodiment. As shown in FIG. 6, to verify the bytecode 220 without a compiler, the bytecode 220 must have been published with the hash of the high-level source code $h_c$ 234 that produced the bytecode 220, and the auditor must have been in possession of the original high-level source code 212 (either retrieved from the blockchain network 104 if the original high-level source code 212 was published there, or, for example, alternatively, retrieved from an online source code repository).

Figure 7:
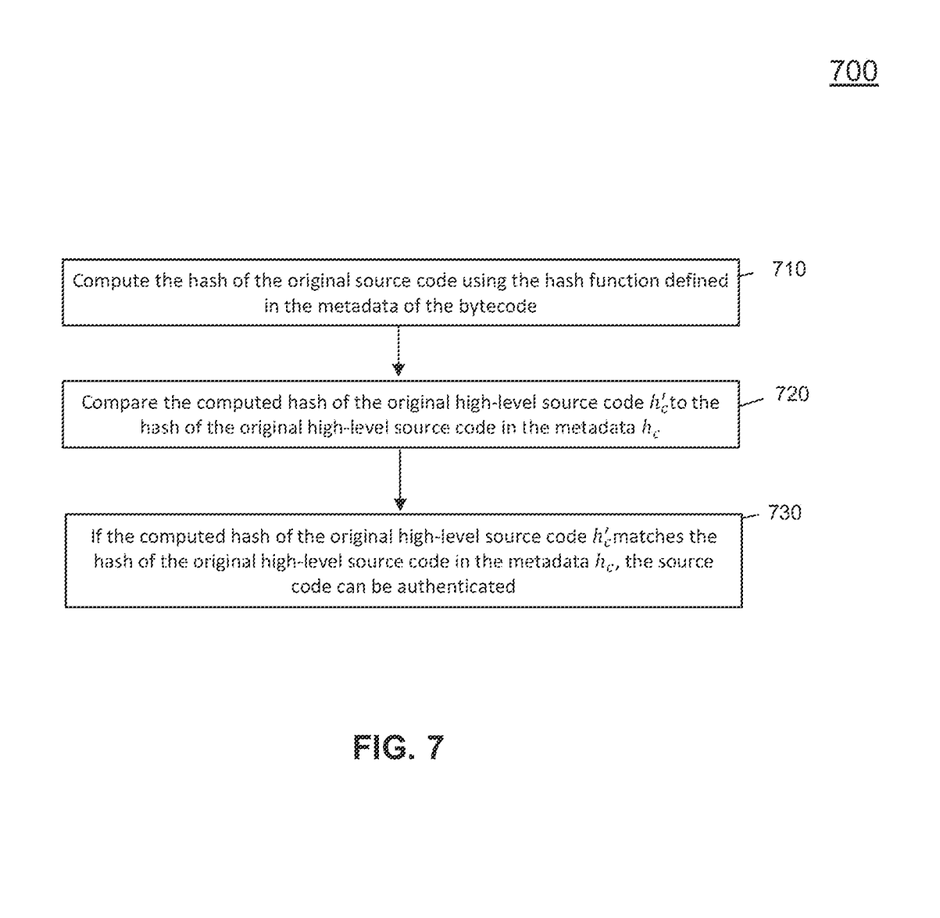
FIG. 7 is a flowchart illustrating a method to verify the bytecode without a compiler as shown in FIG. 6 in accordance with an exemplary embodiment.

FIG. 7 is a flowchart illustrating a method 700 to verify the bytecode 220 of the smart contract 210 without a compiler in accordance with an exemplary embodiment. As shown in FIG. 7, in step 710, to verify, the auditor must compute the hash of the original source code $h'_c$ using the hash function $H_f$ 232 defined in the metadata 230 of the bytecode 220. In step 720, the hash of the original source code $h'_c$ using the hash function $H_f$ 232 defined in the metadata 230 of the bytecode 220 is compared to the hash of the high-level source code $h_c$. In step 730, if $h'_c$ matches $h_c$, the source code can be authenticated as the original high-level source code 212 that produced the bytecode 220, and can be used to audit the smart contract 210.

Verifying the Bytecode with a Compiler

Figure 8:
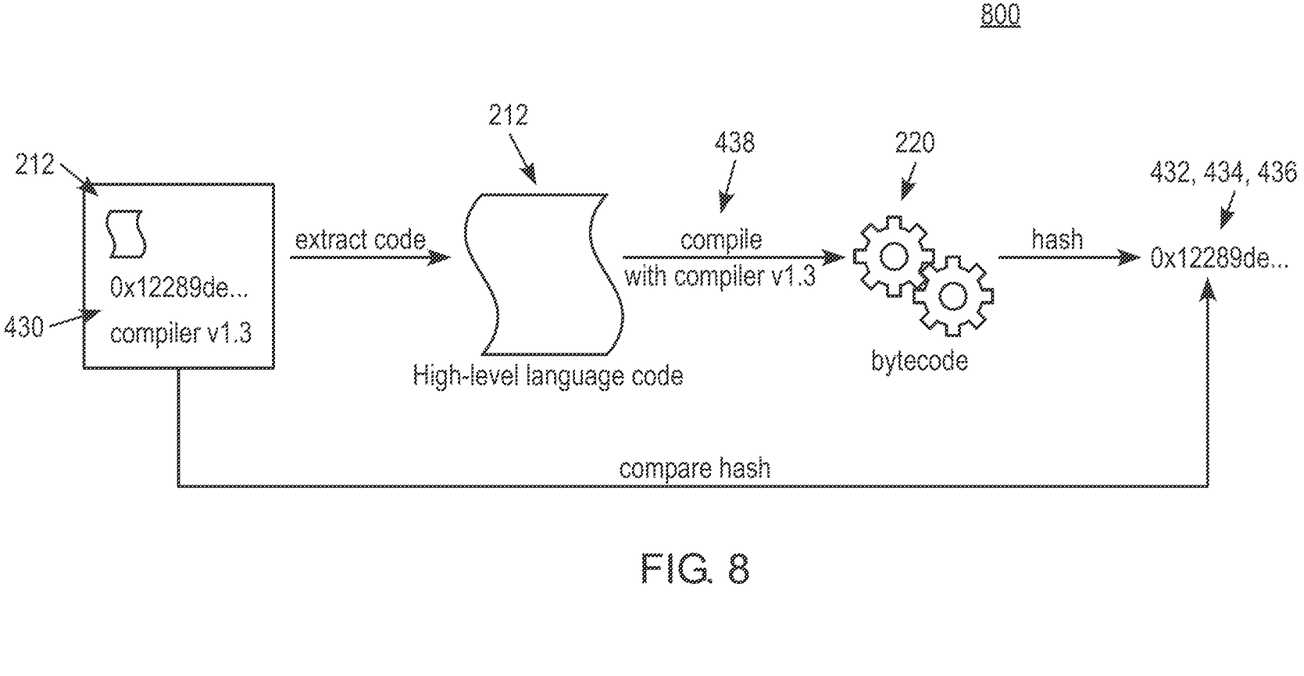
FIG. 8 is a diagram illustrating a method for verifying the bytecode with a compiler in accordance with another exemplary embodiment.

FIG. 8 is a diagram 800 illustrating a method for verifying the bytecode 220 with a compiler in accordance with another exemplary embodiment. As shown in FIG. 8, if the auditor has a compiler, the original high-level source code 212 must have been published with the metadata 430 of the hash of the generated bytecode $h_g$ 434 and the hash function used to hash the generated bytecode $H_f$ 432. In accordance with an aspect, to verify the bytecode 220, the entry containing the published original high-level source code must be retrieved, either by: using the transaction of the published smart contract code, if it is known; searching an entry with $h_t$ equal to the hash of the transaction used to publish the smart contract 210; or searching an entry with $h_g$ to the hash of the generated bytecode 220 (if the hash function is known). In accordance with an embodiment, once located, the published byte code 220 of the smart contract 210 can be extracted. The published bytecode 220 can then be compiled using the version V of the compiler 438 specified in the metadata 430. The resulting bytecode 220 is then hashed using $H_f$ 432 and wherein the result is $h_c$. Note that $h_c$ should match $h_g$ 434, however, this is not a requirement. To verify, the hash of the bytecode 220 is then computed using the hash function $H_f$ 432 specified in the metadata 430. The result is $h_b$. If the two hashes $h_b$ and $h_c$ match, the published high-level code source 212 for the smart contract 210 can reasonably be regarded as the source for the bytecode 220 to audit, and be used for auditing the smart contract logic.

Figure 9:
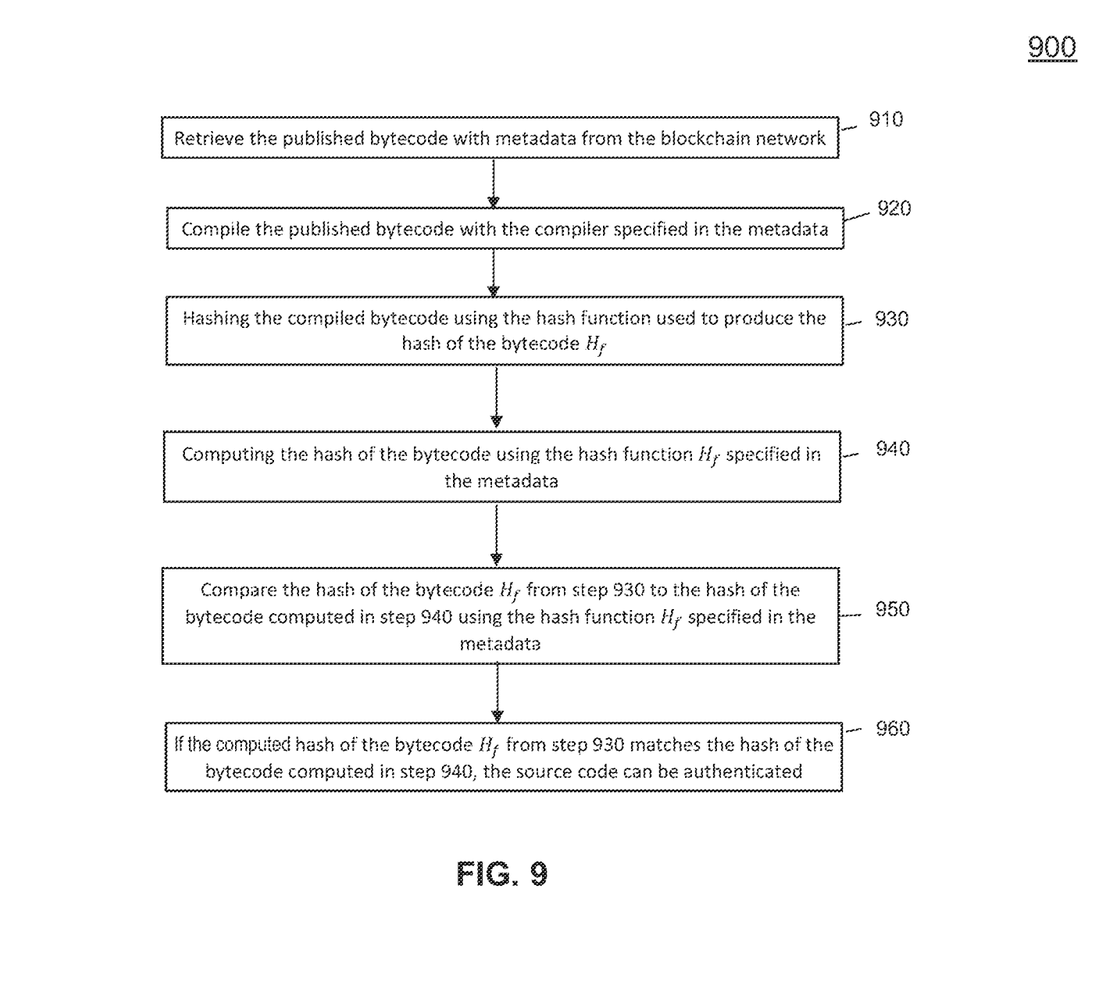
FIG. 9 is a flowchart illustrating the method for verifying the bytecode with the compiler as shown in FIG. 8 in accordance with an exemplary embodiment.

FIG. 9 is a flowchart 900 illustrating the method for verifying the bytecode with the compiler as shown in FIG. 8. As shown in FIG. 9, in step 910, the published bytecode 220 with metadata 430 is retrieved from the blockchain network 104. In step 920, the published bytecode with the compiler specified in the metadata is compiled. In step 930, the compiled bytecode is hashed using the hash function used to produce the hash of the bytecode $H_f$. In step 940, the hash of the bytecode is computed using the hash function $H_f$ specified in the metadata. In step 950, the hash of the bytecode $H_f$ from step 930 is compared to the hash of the bytecode computed in step 940 using the hash function $H_f$ specified in the metadata. In step 960, if the computed hash of the bytecode $H_f$ from step 930 matches the hash of the bytecode computed in step 940, the source code can be authenticated.

Computer System Architecture

Figure 10:
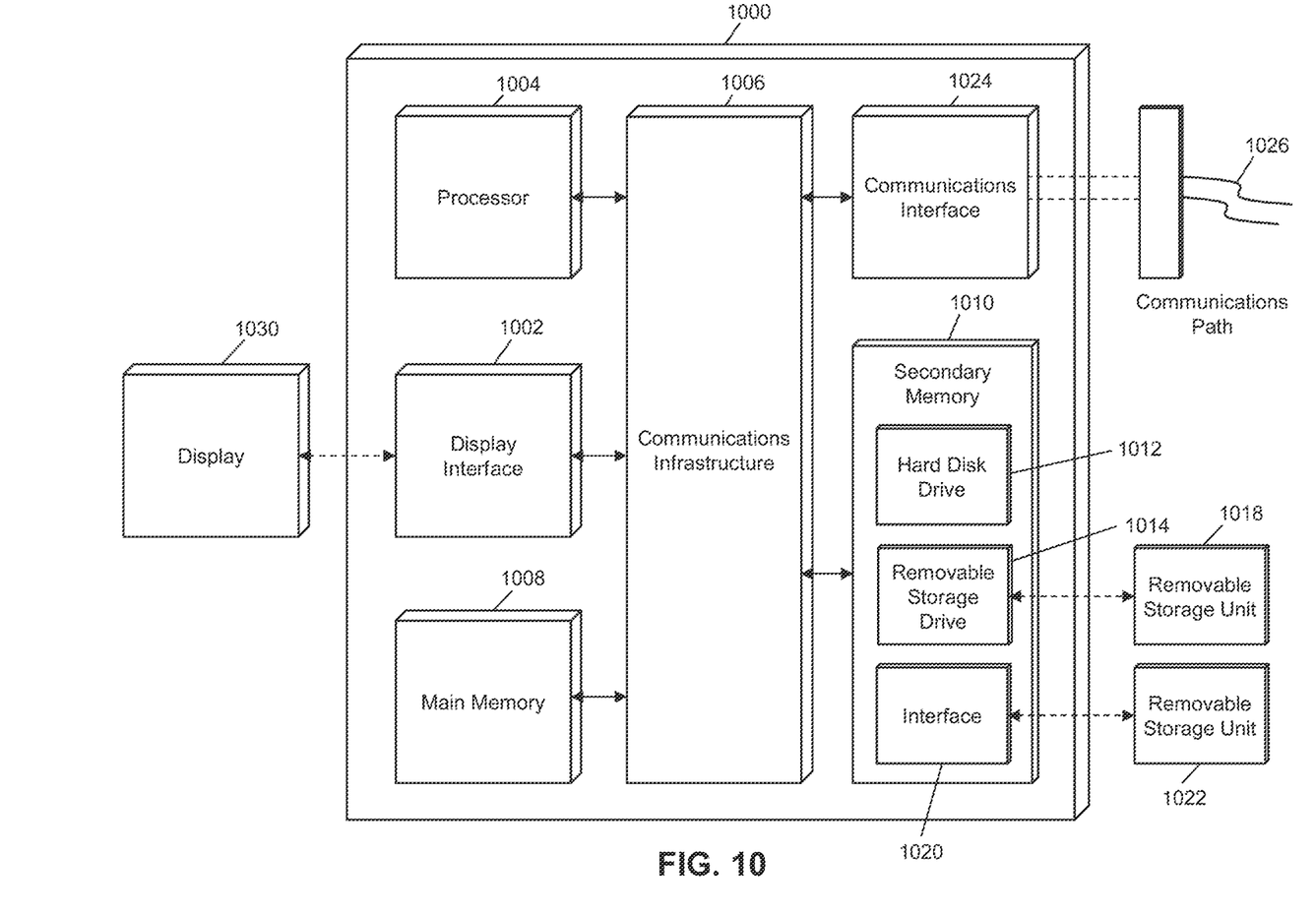
FIG. 10 is a block diagram illustrating a computer system architecture in accordance with exemplary embodiments.

FIG. 10 illustrates a computer system 1000 in which embodiments of the present disclosure, or portions thereof, may be implemented as computer-readable code. For example, the blockchain network 104 of FIG. 1 may be implemented in the computer system 1000 using hardware, non-transitory computer readable media having instructions stored thereon, or a combination thereof and may be implemented in one or more computer systems or other processing systems. Hardware may embody modules and components used to implement the methods of FIGS. 2-9.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1018, a removable storage unit 1022, and a hard disk installed in hard disk drive 1012.

Various embodiments of the present disclosure are described in terms of this example computer system 1000. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1004 may be a special purpose or a general purpose processor device specifically configured to perform the functions discussed herein. The processor device 1004 may be connected to a communications infrastructure 1006, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1000 may also include a main memory 1008 (e.g., random access memory, read-only memory, etc.), and may also include a secondary memory 1010. The secondary memory 1010 may include the hard disk drive 1012 and a removable storage drive 1014, such as a floppy disk drive, a magnetic tape drive, an optical disk drive, a flash memory, etc.

The removable storage drive 1014 may read from and/or write to the removable storage unit 1018 in a well-known manner. The removable storage unit 1018 may include a removable storage media that may be read by and written to by the removable storage drive 1014. For example, if the removable storage drive 1014 is a floppy disk drive or universal serial bus port, the removable storage unit 1018 may be a floppy disk or portable flash drive, respectively. In one embodiment, the removable storage unit 1018 may be non-transitory computer readable recording media.

In some embodiments, the secondary memory 1010 may include alternative means for allowing computer programs or other instructions to be loaded into the computer system 1000, for example, the removable storage unit 1022 and an interface 1020. Examples of such means may include a program cartridge and cartridge interface (e.g., as found in video game systems), a removable memory chip (e.g., EEPROM, PROM, etc.) and associated socket, and other removable storage units 1022 and interfaces 1020 as will be apparent to persons having skill in the relevant art.

Data stored in the computer system 1000 (e.g., in the main memory 1008 and/or the secondary memory 1010) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1000 may also include a communications interface 1024. The communications interface 1024 may be configured to allow software and data to be transferred between the computer system 1000 and external devices. Exemplary communications interfaces 1024 may include a modem, a network interface (e.g., an Ethernet card), a communications port, a PCMCIA slot and card, etc. Software and data transferred via the communications interface 1024 may be in the form of signals, which may be electronic, electromagnetic, optical, or other signals as will be apparent to persons having skill in the relevant art. The signals may travel via a communications path 1026, which may be configured to carry the signals and may be implemented using wire, cable, fiber optics, a phone line, a cellular phone link, a radio frequency link, etc.

The computer system 1000 may further include a display interface 1002. The display interface 1002 may be configured to allow data to be transferred between the computer system 1000 and external display 1030. Exemplary display interfaces 1002 may include high-definition multimedia interface (HDMI), digital visual interface (DVI), video graphics array (VGA), etc. The display 1030 may be any suitable type of display for displaying data transmitted via the display interface 1002 of the computer system 1000, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1008 and secondary memory 1010, which may be memory semiconductors (e.g., DRAMs, etc.). These computer program products may be means for providing software to the computer system 1000. Computer programs (e.g., computer control logic) may be stored in the main memory 1008 and/or the secondary memory 1010. Computer programs may also be received via the communications interface 1024. Such computer programs, when executed, may enable computer system 1000 to implement the present methods as discussed herein. In particular, the computer programs, when executed, may enable processor device 1004 to implement the processes and methods illustrated by FIGS. 2-9, as discussed herein. Accordingly, such computer programs may represent controllers of the computer system 1000. Where the present disclosure is implemented using software, the software may be stored in a computer program product and loaded into the computer system 1000 using the removable storage drive 1014, interface 1020, and hard disk drive 1012, or communications interface 1024.

The processor device 1004 may comprise one or more modules or engines configured to perform the functions of the computer system 1000. Each of the modules or engines may be implemented using hardware and, in some instances, may also utilize software, such as corresponding to program code and/or programs stored in the main memory 1008 or secondary memory 1010. In such instances, program code may be compiled by the processor device 1004 (e.g., by a compiling module or engine) prior to execution by the hardware of the computer system 1000. For example, the program code may be source code written in a programming language that is translated into a lower level language, such as assembly language or machine code, for execution by the processor device 1004 and/or any additional hardware components of the computer system 1000. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 1000 to perform the functions disclosed herein. It will be apparent to persons having skill in the relevant art that such processes result in the computer system 1000 being a specially configured computer system 1000 uniquely programmed to perform the functions discussed above.

Techniques consistent with the present disclosure provide, among other features, systems and methods to audit smart contracts. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method to audit smart contracts, the method comprising:
retrieving, from a blockchain, a published smart contract bytecode with metadata;
extracting a smart contract bytecode from the published smart contract bytecode; and
verifying the smart contract bytecode by comparing a computed hash of a high-level source code of the published smart contract bytecode with the metadata retrieved from the blockchain.

2. The method according to claim 1, further comprising:
writing a smart contract into the high-level source code;
compiling the high-level source code into the smart contract bytecode;
hashing the high-level source code using a hash function of the high-level source code and a hash of the high-level source code; and
generating the metadata for the smart contract using the hash function of the high-level source code, the hash of the high-level source code, and a version of a compiler used to compile the smart contract bytecode.

3. The method according to claim 2, wherein the verifying of the smart contract bytecode comprises:
computing a hash of the high-level source code using the hash function of the high-level source code defined in the metadata of the smart contract bytecode;
comparing the computed hash of the high-level source code using the hash function of the high-level source code defined in the metadata of the smart contract bytecode to the hash of the high-level source code in the metadata; and
authenticating the high-level source code by matching the computed hash of the high-level source code using the hash function of the high-level source code defined in the metadata of the smart contract bytecode and the hash of the high-level source code in the metadata.

4. The method according to claim 1, further comprising:
writing a smart contract into the high-level source code;
compiling the high-level source code into the smart contract bytecode;
hashing the smart contract bytecode using the hash function, and a hash of a transaction publishing of the smart contract bytecode; and
generating the metadata for the smart contract using the high-level source code, the hash function of the high-level source code, the hash of the smart contract bytecode, the hash of a transaction publishing of the smart contract bytecode, and a version of a compiler used to compile the smart contract bytecode.

5. The method according to claim 4, wherein the verifying of the smart contract bytecode comprises:
compiling the published smart contract bytecode with the version of the compiler used to compile the smart contract bytecode in the metadata;
hashing the compiled published smart contract bytecode using the hash function of the high-level source code;
computing a hash of the smart contract bytecode using the hash function of the high-level source code in the metadata;
comparing the hash of the compiled published smart contract bytecode using the hash function of the high-level source code to the computed hash of the smart contract bytecode using the hash function of the high-level source code in the metadata; and
authenticating the high-level source code by matching the hash of the compiled published smart contract bytecode using the hash function of the high-level source code and the computed hash of the smart contract bytecode using the hash function of the high-level source code in the metadata.

6. The method according to claim 1, further comprising:
auditing the high-level source code of the verified smart contract bytecode.

7. A system for auditing smart contracts, the system comprising:

a processing server configured to:
  retrieve, from a blockchain, a published smart contract bytecode with metadata;
  extract a smart contract bytecode from the published smart contract bytecode; and
  verify the smart contract bytecode by comparing a computed hash of a high-level source code of the published smart contract bytecode with the metadata retrieved from the blockchain.

8. The system according to claim 7, wherein the processing server is further configured to:
  write a smart contract into the high-level source code;
  compile the high-level source code into the smart contract bytecode;
  hash the high-level source code using a hash function into a hash a hash of the high-level source code; and
  generate, the metadata for the smart contract using the hash function of the high-level source code, the hash of the high-level source code, and a version of a compiler used to compile the smart contract bytecode.

9. The system according to claim 8, wherein the processing server is further configured to:
  compute a hash of the high-level source code using the hash function of the high-level source code defined in the metadata of the smart contract bytecode;
  compare the computed hash of the high-level source code using the hash function of the high-level source code defined in the metadata of the smart contract bytecode to the hash of the high-level source code in the metadata; and
  authenticate the high-level source code by matching the computed hash of the high-level source code using the hash function of the high-level source code defined in the metadata of the smart contract bytecode and the hash of the high-level source code in the metadata.

10. The system according to claim 7, wherein the processing server is further configured to:
  write a smart contract into the high-level source code;
  compile the high-level source code into the smart contract bytecode;
  hash the high-level source code using a hash function of the high-level source code into a hash of the smart contract bytecode, and a hash of a transaction publishing of the smart contract bytecode; and
  generate the metadata for the smart contract using the high-level source code, the hash function of the high-level source code, the hash of the smart contract bytecode, the hash of a transaction publishing of the smart contract bytecode, and a version of a compiler used to compile the smart contract bytecode.

11. The system according to claim 10, wherein the processing server is further configured to:
  publish the smart contract bytecode on the blockchain.

12. The system according to claim 10, wherein the processing server is further configured to:
  compile the published smart contract bytecode with the version of the compiler used to compile the smart contract bytecode in the metadata;
  hash the compiled published smart contract bytecode using the hash function of the high-level source code;
  compute a hash of the smart contract bytecode using the hash function of the high-level source code in the metadata;
  compare the hash of the compiled published smart contract bytecode using the hash function of the high-level source code to the computed hash of the smart contract bytecode using the hash function of the high-level source code in the metadata; and
  authenticate the high-level source code by matching the hash of the compiled published smart contract bytecode using the hash function of the high-level source code and the computed hash of the smart contract bytecode using the hash function of the high-level source code in the metadata.

13. The system according to claim 7, wherein the processing server is further configured to:
  audit the high-level source code of the verified smart contract bytecode.

* * * * *